United States Patent
Uphoff

[15] 3,673,325
[45] June 27, 1972

[54] CATHODE RAY TUBE DISPLAY SYSTEM FOR ULTRASONIC AND RADAR ECHO SIGNALS

[72] Inventor: Russel L. Uphoff, Stamford, Conn.
[73] Assignee: Hoffrel Instruments Incorporated, Norwalk, Conn.
[22] Filed: April 10, 1970
[21] Appl. No.: 27,283

[52] U.S. Cl...........................178/7.5 D, 340/1 R, 343/5 R, 73/67.7, 315/30, 374/121
[51] Int. Cl.................G01s 9/66, G01s 9/08, H01j 29/52, G01r 13/34
[58] Field of Search..........73/67.8, 69, 67.7; 178/7.3 D, 178/7.5 D, 6.8, DIG. 1, DIG. 37; 340/1 R, 3 C; 324/88, 121; 343/5 R, 5 CM, 6 TV; 315/30

[56] References Cited

UNITED STATES PATENTS

| | | | |
|---|---|---|---|
| 3,153,928 | 10/1964 | Uphoff et al. | 73/67.8 |
| 3,367,173 | 2/1968 | Uphoff | 73/67.8 |
| 3,395,572 | 8/1968 | Sinclair | 73/67.8 |

Primary Examiner—Robert L. Griffin
Assistant Examiner—John C. Martin
Attorney—Stoll and Stoll

[57] ABSTRACT

A system for displaying signals, particularly ultrasonic or radar echo signals, on a cathode ray tube, wherein a raster is constructed utilizing vertical and horizontal sweeps of suitable duration, intensity modulation of the electron beam is by application of the echo signals to the grid or cathode and modulation of the amplifier gain by one of the sweep waveforms or a waveform synchronous therewith to display the echo amplitudes on the raster.

6 Claims, 8 Drawing Figures

Patented June 27, 1972 3,673,325

INVENTOR.
RUSSEL L. UPHOFF
BY
Stoll and Stoll
ATTORNEYS

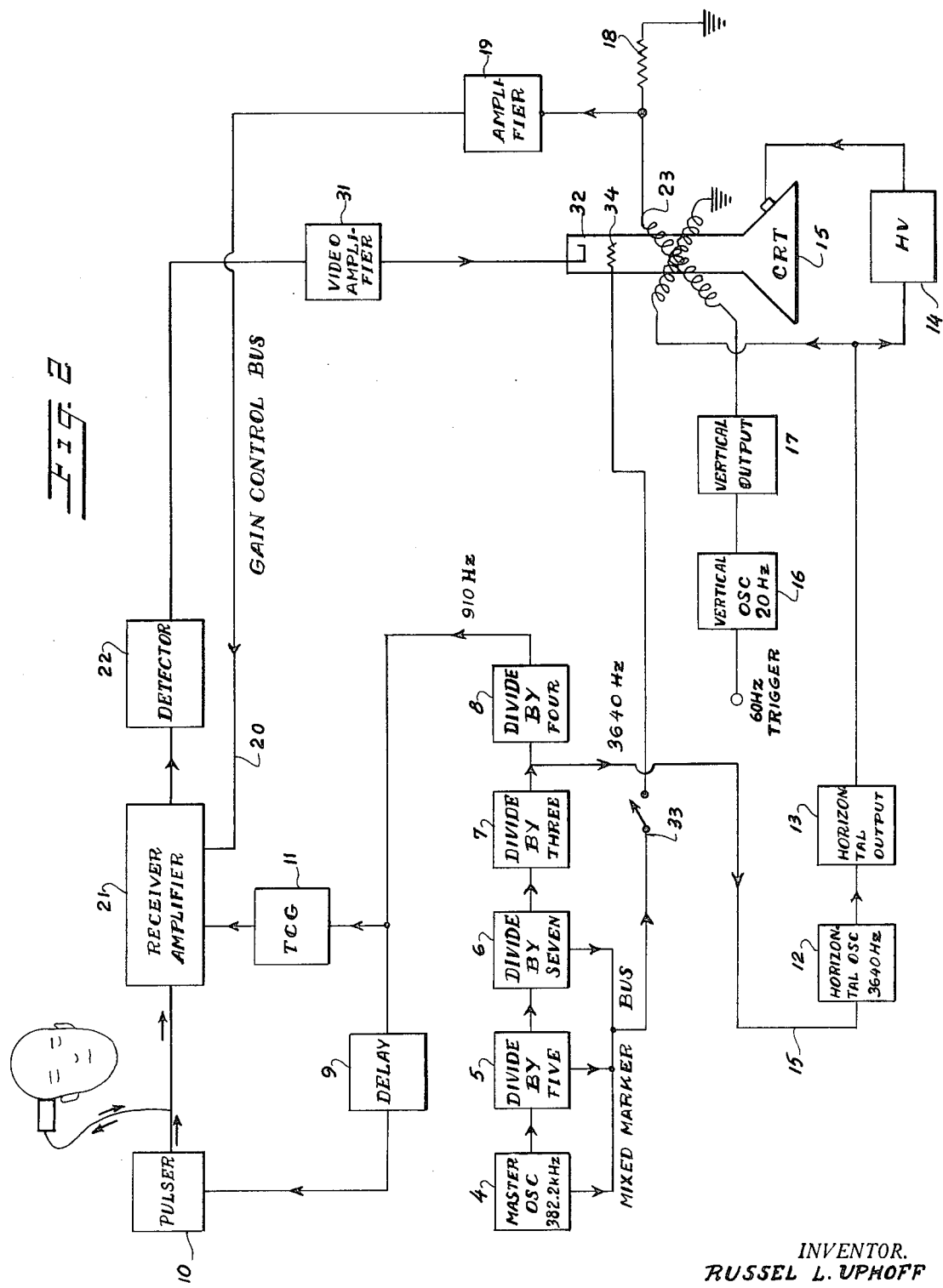

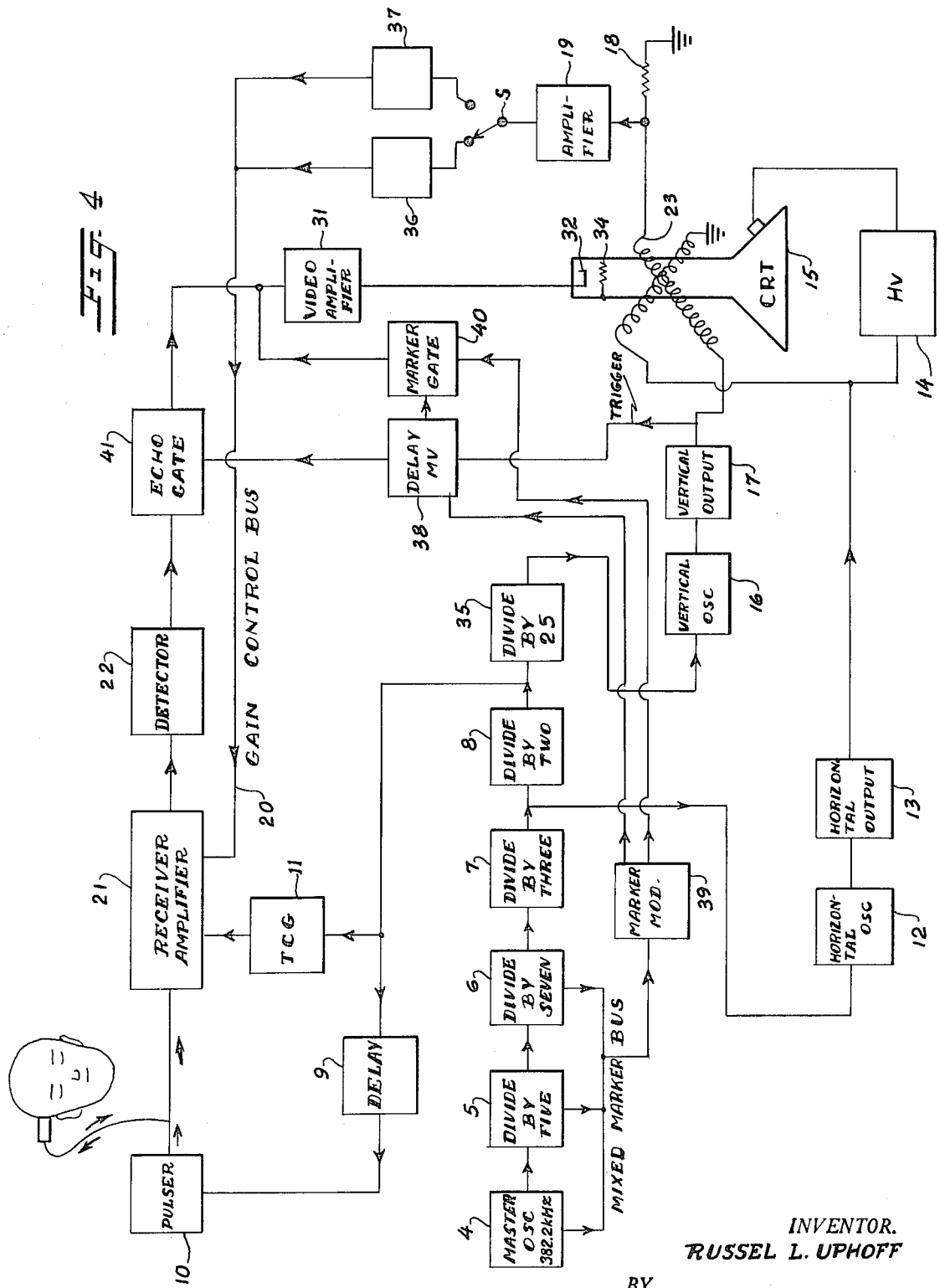

INVENTOR.
RUSSEL L. UPHOFF
BY
Stoll and Stoll
ATTORNEYS

CATHODE RAY TUBE DISPLAY SYSTEM FOR ULTRASONIC AND RADAR ECHO SIGNALS

BACKGROUND OF THE INVENTION

1. Field of the Invention

Ultrasonic medical diagnosis, ultrasonic inspection systems and radar.

2. Description of the Prior Art

The oldest display system still in general use is a deflection modulated time base known as the "A-scope." In systems which dispense with coupling means for positioning the cathode ray tube (hereinafter CRT) trace from the position and/or direction of the antenna or transducer, such as portable equipment, the A-scope is most often utilized. In fact, it is believed that more A-scopes are in use than all other types combined in the fields of ultrasonic diagnosis and flaw detection.

Television picture tubes are magnetically deflected CRT's. Because of its inherent simplicity and its advanced development due to wide television use, it is commercially available in many sizes and shapes at relatively low cost. The envelope length of the magnetic tube is, for a given face area, much shorter than is the envelope length in an electrostatically deflected tube. Equipment utilizing the magnetically deflected CRT would accordingly benefit from lower costs, smaller dimensions and lighter weight. Magnetically deflected CRT's do not require deflection voltages as high as are needed by low and moderate cost electrostatic CRT's and accordingly are advantageous when using solid state circuitry.

Various types of CRT displays are described in Soller, Star and Valley, CRT Displays, Volume 22, MIT Rad. Lab. Series, pages 13–23. While particular attention is given to the radar field in that publication, radar display system terminology has been adopted for use in the ultrasonic field.

Several problems arise and are formidable in using magnetic tubes in A-scope systems. The basic trouble has been the necessity for passing rapidly changing waveforms through the inductance of the vertical deflection yoke. Such currents exhibit typical rise times of 10 to 500 nanoseconds and pulse lengths of less than 0.1 to 5 microseconds.

SUMMARY OF THE INVENTION

The present invention is of a CRT display which provides A-scope information yet is inherently capable of utilizing magnetic CRT's.

The present invention provides a system having the particular advantage of the ability to obtain not only linear amplification but also logarithmic and other special amplification characteristics by simple means such as simple switching to provide several different characteristics with the same instrument.

Basically, and not by way of limitation, the present invention utilizes vertical and horizontal sweeps to construct a raster on the CRT. The intensity of the electron beam is modulated by applying echo signals to the CRT grid or cathode. The amplifier gain is modulated by one of the sweep waveforms to display the echo amplitudes on the raster. Alternatively, the amplifier gain may be modulated by a waveform synchronous with one of the sweeps.

By use of the system as described, it will be seen that particularly sharp and distinctive displays of high frequency echo signals may be had on a magnetically deflected A-scope. Such echoes may be radar pulse returns or ultrasonic returns from medical diagnosis systems. Medical diagnostic systems include means for highly accurate determination of the midline of the brain, determination of fetal head size, of heart wall thickness, of eye size, of placenta localization and of foreign body location. Ultrasonic techniques may also be used for mechanical inspection systems including flaw and thickness detectors.

BRIEF DESCRIPTION OF THE DRAWING

FIG. 2 is a schematic block diagram of the system of the present invention with particular application of echoencephalography (ultrasonic diagnostic system for locating the midline of the brain).

FIG. 4 is a schematic similar to that of FIG. 2 but showing variations in the circuit.

DESCRIPTION OF PREFERRED EMBODIMENTS OF THE INVENTION

Figure 1:
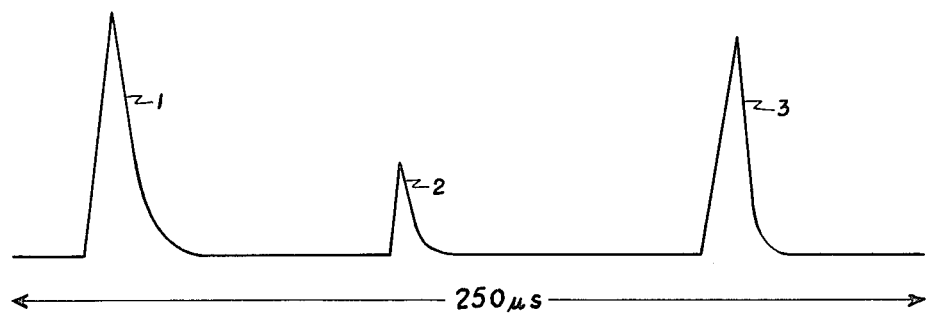
FIG. 1 shows a typical waveform in A-scope presentation with an initial pulse and two echoes.
Figure 1A:
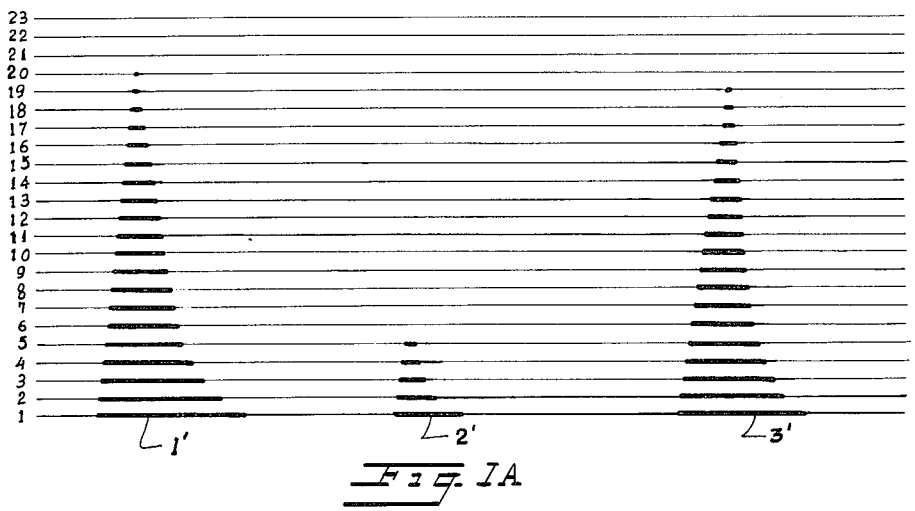
FIG. 1A shows the same waveform displayed on a raster utilizing the system of the present invention.

Referring to the drawing and to FIGS. 1 and 1A in particular, a typical waveform is shown. An initial pulse is indicated at reference character 1 and 1', a first echo at reference numerals 2 and 2° and a second echo at reference numerals 3 and 3'. The total sweep length is approximately 250 microseconds. In FIG. 1, the waveform is shown in the familiar manner.

FIG. 1A shows the same waveform signals displayed on the system of the present invention. The raster is shown as light horizontal lines 250 microseconds in length. The vertical sweep frequency is adjusted so that 25 horizontal lines occur per frame, that is, the vertical frequency is one twenty-fifth of the horizontal frequency. Two of the horizontal lines are not shown because they are lost in the vertical retrace. The vertical sweep is from bottom to top but it should be noted that this is not a necessary requirement of the system. The lines have been numbered for convenience.

On line 1 the signal amplifier is at maximum gain and all three signals (1', 2' and 3') are therefore shown at maximum width. As the vertical sweep proceeds upwardly the amplifier gain is slowly reduced by a gain modulating waveform which is fed to the receiver. Thus, by line six the signal shown at 2' disappears from the presentation and by line 19 the same is true of the signal at 3'. At line 21 and above the amplifier gain is reduced to a value sufficiently low to prevent any of the three signals from appearing. The presentation of the echo signal amplitudes on the raster is the heart of the present invention.

Accordingly, it has been seen that the signals originally reproduced as shown in FIG. 1 may be reproduced as shown in FIG. 1A without having to apply any video signals to the deflection coils of the CRT. In actual use the raster brightness can be adjusted and reduced so that only the signals remain visible, as has been done in FIGS. 5 and 6. Also, in actual use a lower vertical sweep frequency could be used so that substantially more than 25 raster lines would be obtained.

Referring now to the circuit shown in FIG. 2, a master oscillator 4 operates at 382.2 kHz. This is the frequency necessary to generate markers at 2 mm intervals in brain tissue. A string of dividers 5, 6, 7 and 8 are so selected as to give such other markers as may be desired. The dividers are labeled in FIG. 2 with respect to individual division. The total division yielded is 420 and an output trigger pulse rate of 910 Hz is provided. These pulses are used to trigger a time controlled gain circuit 11 (hereinafter TCG 11) and, after being delayed by a suitable delay circuit 9, the pulses are used to trigger a transducer pulser 10. The circuit thus far described is common practice in pulse-echo ultrasonography as applied to medical diagnosis.

A horizontal oscillator circuit 12, and a horizontal output circuit 13 are similar to those used in television practice to generate sweeps for magnetically deflected CRTs. Also, a high voltage circuit 14 may be of the fly-back type commonly used in television practice to generate the high accelerating voltage used for the CRT. In order to ensure a high enough operating frequency for the fly-back power supply, horizontal oscillator 12 is run at a multiple (in this case a multiple of 4) of the pulse recurrence frequency. Thus the horizontal oscillator is synchronized by a connection 15 at a frequency of 3,640 Hz by pulses from the divider chain. Since pulser 10 is operated at 910 Hz, only every fourth horizontal line is active, containing useful signal information. Signals arriving at other times are not amplified since the TCG system 11 is also keyed at 910 Hz, and is designed so as to ensure that the receiver gain is kept low at all times except during the active sweeps.

Obviously, other arrangements are possible. For example, divider 8 could be designed to divide by two in which case the pulser would operate at 1,820 Hz and every other line would be active.

Referring again to FIG. 2, the vertical sweep is derived from a vertical oscillator circuit 16 and vertical output circuit 17 similar to that used in television practice. In this case, the vertical sweep is synchronized at 20 Hz from the 60 Hz line frequency although this is not a requirement of the system. A voltage signal which is synchronous with and a duplicate of the vertical sweep current is picked up across resistor 18 in series with vertical sweep coil 23. This vertical sweep signal, which may be amplified in circuit 19 if the voltage at element 18 is too low, is fed by connection 20 to the signal receiver and amplifier 21 in such a manner as to reduce the gain of the amplifier. Element 18 may be a resistor, as shown, or other form of impedance to provide other gain characteristics. Alternatively, the vertical sweep signal can be fed to the amplifier or the detector so as to provide a variable clipping for signals being amplified by the system. One advantage of the control of the clipping level is that a linearly changing sweep voltage (a sawtooth wave) will produce an accurately linear change in the gain of the system.

Figure 3:
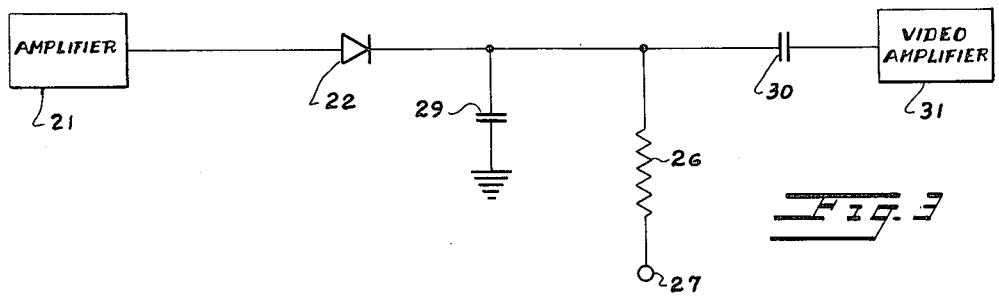
FIG. 3 is a schematic diagram of a diode bias level varying circuit.
Figure 3A:
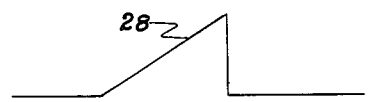
FIG. 3A is a waveform of a gain control signal used to back bias a detector diode.

A circuit which produces an overall linear characteristic by varying the bias level of the detector diode and without any wave shaping of the sweep voltage is shown in FIG. 3. Signals obtained from amplifier 21 are rectified by detector diode 22 and appear across load resistor 26, higher frequency components being filtered by small capacitor 29. Gain control waveform 28 (FIG. 3A) derived from resistor 18 (FIG. 2) is used to back bias diode 22 providing a linear modulation of the signals appearing across load resistor 26. Small capacitor 30 passes pulses on to video amplifier 31 and blocks the passage of the low frequency modulating waveform 28.

The exact means used to control the gain of amplifier 21 may be any one of a number well known to the art of automatic gain control. For example, variable amplification-factor tubes may be used, or alternatively, the gain control waveform 28 may be fed to the screens of one or more vacuum tubes of the amplifier. Generally speaking, with most gain control systems, such as the use of variable amplification-factor tubes in the amplifier, a linearly changing waveform will tend to produce a logarithmic characteristic in the amplification system. One advantage of a logarithmic presentation is that a wide dynamic range of signals can be shown on the presentation. Taking FIG. 1 as an example, the ratio of the amplitudes of echo 3 or 3' to echo 2 or 2' is about 4 to 1 in a linear presentation whereas it might well be 100 to 1 in a logarithmic presentation.

For solid state amplifiers, similarly, any one of the means known to the automatic gain control art may be used. Specifically with transistor amplifiers, emitter-current or collector-base gain control may be used depending on the type of transistors used and the type of characteristic desired.

As a further means of gain control, a voltage controlled attenuator may be used at an appropriate place in the amplifier string. An example of such an attenuator is described by W.T. Bodtmann, *Design of Broadband Varilossers*, Bell System Technical Journal, Vol. 48: No. 6, pp 1687–1702.

In any case, and regardless of the gain control method used, the output of the detector circuit 22 (FIG. 2) is amplified by video amplifier circuit 31 and fed to cathode 32 of cathode ray tube 15 so as to brighten the raster line whenever a signal occurs.

Referring again to FIG. 2, switch 33 is provided to apply marker signals to the grid 34 of CRT 15. This forms a grid of light vertical marker lines upon which the echoes may be superimposed. Such marker lines are a valuable aid in accurately determining the position of an echo.

For simplicity, the signals are shown in FIG. 1 and 1A as simple pulses; they are such after they have been rectified and filtered in the detector stage 22 (FIG. 2). It should be understood that in both radar and ultrasonic art, these signals pass through the low level amplifier stages as AC pulses consisting typically of 2 or more cycles. It should also be understood that in some systems, the AC pulses are not detected but are simply amplified and applied directly to the CRT.

In the system disclosed in FIG. 2, the vertical sweep was 20 Hz and horizontal sweep was 3,640 Hz. Since the two frequencies are not derived from the same source, the latter is not apt to remain an exact multiple of the former and the raster lines will tend to move through the picture. It is possible to construct a system using a vertical sweep which is operated at an exact submultiple of the horizontal sweep and in which, therefore, the horizontal lines appear to be "locked" in the raster. Such a system is shown in FIG. 4 which is generally similar to the system shown in FIG. 2 except that an additional divider circuit 35 is added to synchronize the vertical oscillator, causing the raster lines to appear stationary in the picture.

FIG. 4 also contains a number of other variations of the system disclosed in FIG. 2. Included in these variations are circuits 36 and 37 which are selectable by switch S. The function of circuits 36 and 37 is to distort the waveform picked up from resistor 18 in such a manner as to complement the characteristic of the controlled gain stage of receiver circuit 21, producing the desired overall characteristic. As pointed out above, this overall characteristic may be linear, logarithmic, quasi-logarithmic, or other, depending upon the desired end use of the device. Distorting circuits 36 and 37 can, for example, be diode function generators of the type that are well known in the analog computing field.

Figure 5:
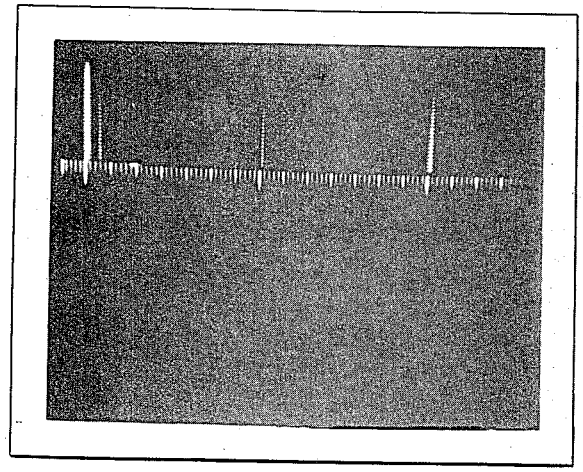
FIGS. 5 and 6 are reproductions of photographic likenesses of waveforms displayed in accordance with the teaching of the present invention. The raster is now shown, but vertical markers are shown in FIG. 5.
Figure 6:
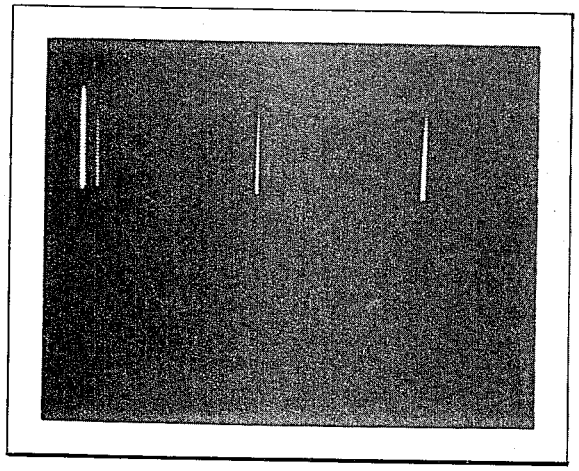

Finally, FIG. 4 contains automatic means for displaying vertical calibration markers during a portion of the raster and then at a predetermined point switching the markers off and switching the echoes on for the rest of the raster. This is accomplished by delay multivibrator circuit 38 which is triggered by the vertical retrace waveform applied to the vertical coils 23 of the deflection yoke. Delay multivibrator 38 operates a marker modulator circuit 39 so as to turn the markers on gradually; in this manner, principal markers are seen on the raster before the minor markers of the marker scale. Delay multivibrator 38 also operates a gating circuit 40 allowing the markers to pass onto video amplifier circuit 31. During the period when gating circuit 40 is open, passing markers, gating circuit 41 is closed, blocking the passage of echoes. At the end of the delay period of multivibrator 38, the gating circuit 40 is closed, blocking the markers, and gating circuit 41 is opened, allowing echoes to pass to video amplifier circuit 31. The end result of the switching process is shown in FIG. 5 in which a marker scale is displayed on the bottom of the raster and the echoes are displayed above it on the top of the raster. The display shown in FIG. 5 is photographed from an instrument for ultrasonic diagnostic use in which the small markers represent 2 mm, the medium markers 1 cm, and the largest markers 7 cm of tissue. It will be noted that due to the action of the modulator circuit 39, the 7 cm markers are longest, the 1 cm markers are of medium length, and the 2 mm markers, shortest. The contribution that this makes to the readability of the scale is obvious. The desirability of automatically displaying markers on the raster with the echoes can be seen by comparing FIG. 5 with FIG. 6 in which the echoes are displayed alone.

While the foregoing is illustrative of preferred embodiments of the invention, it is clear that other embodiments may be had within the broad teachings hereof. For example, although the system has been described with the use of magnetically deflected cathode ray tubes, there is no intention to imply that the disclosed circuit is limited in application to systems using that display device. To illustrate, the system can be used with electrostatically deflected display tubes. In this manner, the advantages of the disclosed device, in particular the facility for changing the wave display from linear to logarithmic or other non-linear mode by modifying distorting circuits 36 and 37, can be obtained using the latter type of cathode ray tube.

What is claimed is:

1. A method for displaying echo signals on a cathode ray tube, comprising the steps of:
   a. constructing a raster on the cathode ray tube by feeding vertical and horizontal sweep waveforms of suitable duration to the deflection coils of the cathode ray tube;
   b. intensity modulating the cathode ray tube electron beam by the signals to be displayed; and
   c. modulating the gain of the signal amplifier by at least one sweep waveform or a waveform synchronous with a sweep waveform and feeding the modulated signals to the cathode ray tube such that as the vertical sweep moves upward on the screen the gain is reduced whereby the signal amplitudes are displayed with the raster on the screen.

2. A method for displaying signals on a cathode ray tube in accordance with claim 1, wherein:
   the vertical sweep frequency applied to the vertical deflection coil is selected to be an integer fraction of the horizontal sweep frequency applied to the horizontal deflection coil.

3. A method for displaying signals on a cathode ray tube in accordance with claim 1, wherein:
   the cathode ray tube electron beam is intensity modulated by application to the grid of the signals to be displayed.

4. A method for displaying signals on a cathode ray tube in accordance with claim 1, wherein:
   the cathode ray tube electron beam is intensity modulated by application to the cathode of the signals to be displayed.

5. A method for displaying signals on a cathode ray tube in accordance with claim 1, wherein:
   the amplifier gain is modulated by a sweep waveform fed to the receiver at a frequency which is an integer fraction of one of the sweep frequencies.

6. A method for displaying echo signals on a cathode ray tube, comprising the steps of:
   a. constructing a raster on the cathode ray tube by feeding vertical and horizontal sweep waveforms of suitable duration to the deflection coils of the cathode ray tube;
   b. intensity modulating the cathode ray tube electron beam by the signals to be displayed; and
   c. modulating the gain of the signal amplifier by at least one sweep waveform or a waveform synchronous with a sweep waveform and feeding the sweep modulated signals to the cathode ray tube so as to intensity modulate the cathode ray tube during the period of display of said raster and display the amplitude of the signals.

* * * * *

UNITED STATES PATENT OFFICE
CERTIFICATE OF CORRECTION

Patent No. 3,673,325                    Dated    June 27, 1972

Inventor(s) Russel L. Uphoff

It is certified that error appears in the above-identified patent and that said Letters Patent are hereby corrected as shown below:

In the drawing, Figure 4 is corrected by reversing the direction of the arrows shown on the connection between delay multivibrator 38 and marker modulator circuit 39 such that the arrows point from the former and toward the latter.

Signed and sealed this 2nd day of January 1973.

(SEAL)
Attest:

EDWARD M.FLETCHER,JR.                ROBERT GOTTSCHALK
Attesting Officer                    Commissioner of Patents